United States Patent Office 3,613,245
Patented Oct. 19, 1971

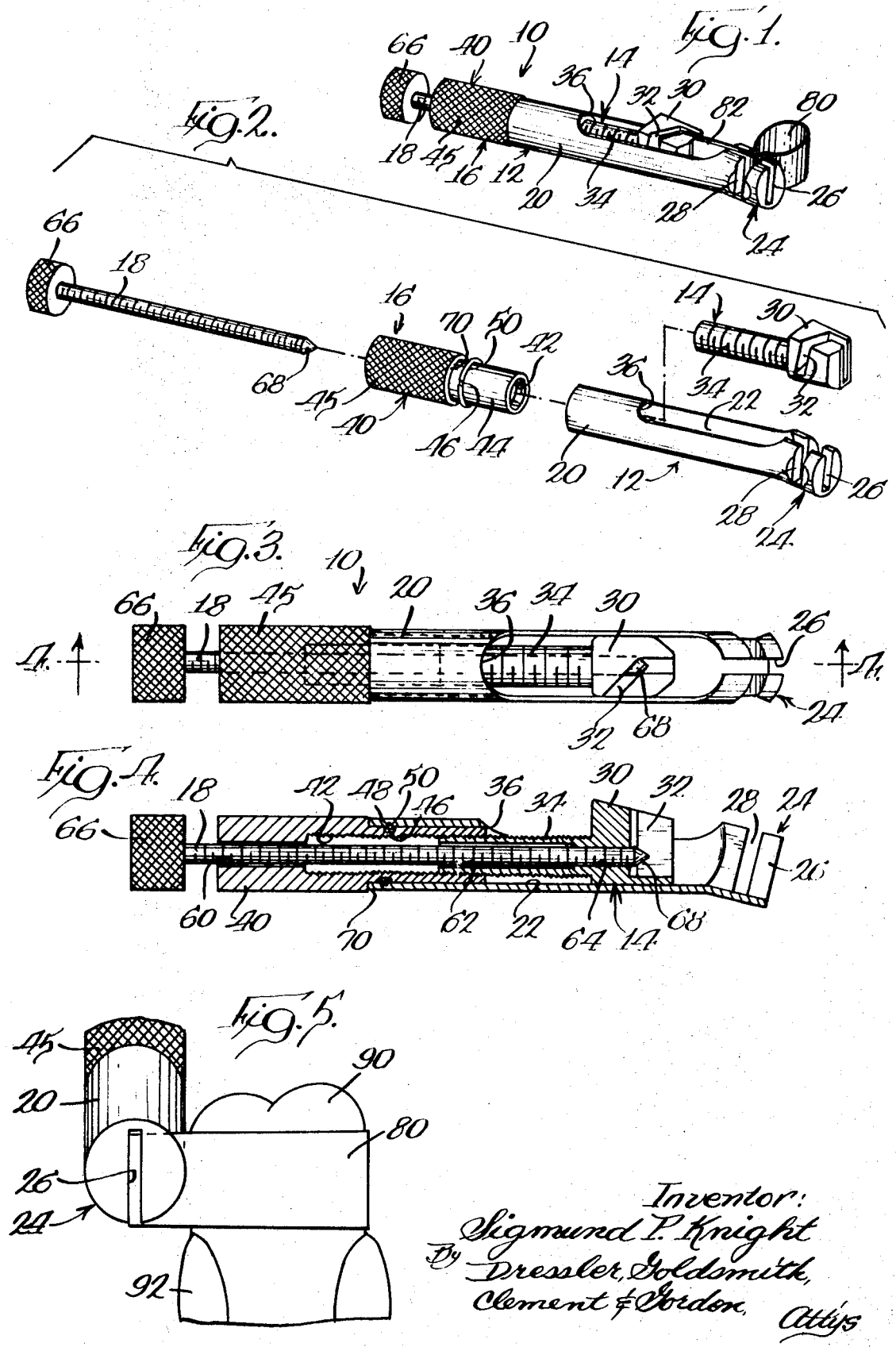

3,613,245
MATRIX RETAINER
Sigmund P. Knight, 535 N. Michigan Ave.,
Chicago, Ill. 60611
Filed Nov. 3, 1969, Ser. No. 873,533
Int. Cl. A61c 5/12
U.S. Cl. 32—63                                    7 Claims

ABSTRACT OF THE DISCLOSURE

A dental matrix retainer for clamping a matrix band around a tooth. The retainer includes an elongated member having slots defined on one end thereof and slidably supporting a block within an opening. The block has clamping means for locking the ends of a looped matrix band therein with intermediate portions of the band being received in at least one of the slots. The movable block has a major portion enclosed by said member and has an externally threaded portion extending towards the opposite end of the opening. A sleeve having an internally threaded bore is rotatably supported within the opposite end of the opening and the threaded bore cooperates with the externally threaded portion to shift the block within the opening upon rotation of the sleeve in opposite directions.

BACKGROUND OF THE INVENTION

The present invention relates to improvements in a dental matrix retainer.

In the dental art, what is commonly referred to as a matrix includes a matrix band and a matrix retainer. The band is employed to engage the vertical walls of a tooth during a cavity filling operation, while the retainer supports the opposite ends and is constructed to allow the dentist to place a proper amount of tension on the band.

One type of matrix retainer which has found considerable commercial success is disclosed in Tofflemire U.S. Pat. No. 2,591,745. The Tofflemire retainer includes a bar-like frame slidably supporting a clamping block with matrix band guide means on one end of the block. The clamping block is moved on the frame by a sleeve rotatably supported on the opposite end of the frame and threadedly receiving a screw having its free end threaded into an opening in the block. The free end of the screw cooperates with a recess to clamp the ends of a matrix band. Thus, rotation of the screw relative to the frame will lock the matrix band to the clamping block while rotation of the sleeve relative to the frame and retention of the screw in fixed relation to the block will cause an axial shifting of the block.

While such an arrangement has been utilized by the dental profession for some time, a matrix retainer of this type has been found to have several serious drawbacks. One of the problems encountered is that the internal threads within the bore in the clamping block are subjected to an extreme amount of wear and eventually wear a sufficient amount so as to prevent locking of the ends of the band within the block. When such a condition occurs, the construction of the matrix retainer dictates that the entire retainer must be replaced.

Another inherent disadvantage in the Tofflemire retainer is the fact that the major portion of the threaded screw, located between the clamping block and the opposite end of the retainer, is completely exposed. With such an arrangement, it has become very difficult to prevent the patient's lips and/or tongue from being lacerated while the matrix band is being secured in snug embracing relationship with the vertical walls of the tooth.

An additional problem encountered with the Tofflemire retainer is that the band guide means on the end of the retainer has a tendency to penetrate into the gums while the retainer is being secured to the band and while the band is being clamped around the tooth. Such a condition is not only annoying to the patient, but many times results in extreme pain due to the laceration of the gums while the band is applied to the tooth.

SUMMARY OF THE INVENTION

The present invention contemplates a matrix retainer for securing a matrix band to a tooth and which overcomes all of the above-mentioned disadvantages of the Tofflemire retainer. Furthermore, the various elements forming the retainer are interconnected in a manner that the entire retainer may readily be disassembled and any one of the parts subjected to extensive wear may be replaced.

More specifically, the matrix retainer of the present invention includes an elongated member having a matrix band guide adjacent one end thereof and which substantially encloses a clamping block for the matrix band. The clamping block, or movable block, is axially shiftable relative to the elongated member by a sleeve, which is releasably retained for rotation within the opposite end of the elongated member. The sleeve has a threaded portion which cooperates with a threaded portion on the movable block to produce axial movement of the movable block in response to rotation of the sleeve relative to the elongated member. The clamping means on the movable block includes a separate screw threaded into the block. The free end of the screw cooperates with a wall of a recess in the movable block, which receives the ends of the matrix band.

Furthermore, the peripheral surfaces of the elongated member, as well as the matrix band guide means on the end thereof, are substantially circular in cross section, so as to eliminate any sharp edges, which tend to penetrate into the gums while the matrix band is being applied to a tooth.

BRIEF DESCRIPTION OF THE SEVERAL VIEWS OF DRAWINGS

FIG. 1 is a perspective view of the matrix retainer constructed in accordance with the present invention and having a matrix band secured therein;

FIG. 2 is an exploded view of the various parts of the matrix retainer shown in FIG. 1;

FIG. 3 is a top plan view of the matrix retainer in its assembled condition;

FIG. 4 is a vertical sectional view taken generally along lines 4—4 of FIG. 3; and FIG. 5 is an enlarged view of the band and retainer applied to a tooth.

DETAILED DESCRIPTION

FIG. 1 of the drawings discloses the matrix retainer 10 constructed in accordance with the present invention, while FIG. 2 shows an exploded view of the various parts of the retainer. As shown in FIG. 2, the matrix retainer 10 includes an elongated member 12, a movable clamping block 14, moving means 16 for the clamping block 14, and a screw 18 adapted to cooperate with the clamping block 14 for locking the ends of a matrix band to the clamping block.

The elongated member 12 has a main body portion 20 having an internal opening 22 which is closed at one end by matrix band guide means 24. The matrix band guide means 24 is in the form of a substantially circular member or portion on the end of the body portion 20 having first and second intersecting slots 26 and 28 defined therein. The slots 26 extend axially of the opening 22, while the slots 28 extend transversely of the axis of the opening 22.

The movable clamping block 14 includes a main body portion 30 having a recess 32 therein, for a purpose which will be described later. An externally threaded portion 34 extends from one end of the body portion 30 and the entire movable block is adapted to be received through an elongated passageway or lateral slot 36 extending from the opening with the slot located adjacent the end of the elongated member 12 having the matrix band guide means 24.

The moving means 16 for the block includes a sleeve 40 having an internally threaded bore 42 defined on one end portion 44 thereof and a knurled portion 45 on the opposite end. The internally threaded bore 42 is adapted to receive the externally threaded portion 34 of the movable block in the assembled condition of the retainer.

The moving means 16 and the elongated member 12 have means which cooperate for releasably supporting the part for rotation within the opposite end of the opening 22 in the elongated member. In the illustrated embodiment, the releasable retaining means is in the form of cooperating grooves 46 and 48, respectively defined on the external surface of the end portion 44 of the part 40 and the internal wall of the sleeve 20 adjacent the open end thereof. A releasable retaining element in the form of a split ring 50 is adapted to be received in the respective grooves 46 and 48, which are transversely aligned when the moving means 16 is received in the opposite end of the elongated member, as more clearly shown in FIG. 4.

The remaining element of the retainer 10 is the screw 18, which cooperates with the recess 32 defined on the movable block 14 to lock the end of a matrix band into the recess. For this purpose, the sleeve 40 has a reduced diameter clearance opening 60 extending from the internally threaded bore 42, so that the screw 18 may extend through the bore 42 and the opening 60. The free end of the screw 18 extends through a clearance opening 62, defined in the externally threaded portion 34 of the movable block 14, and cooperates with an internally threaded portion 64 of the opening 62 in main body portion 30. The threaded portion 64 of the opening or bore 62 is in communication with the recess 32. Thus, rotation of the screw 18 through the knob 66 formed on the opposite end thereof will move the free end 68 of the screw towards a wall of the recess 32, so as to lock the end of the band within the recess.

The various parts forming the matrix retainer are assembled by inserting the movable block 14 into the opening 22 through the passageway or lateral slot 36 with the threaded portion 34 extending towards the open end of the opening 22 in the elongated member 12. As is evident from FIGS. 3 and 4, a minor portion of main body portion 30 extends outwardly of slot 36, and the lateral edges of the slot guide member 30 as it moves longitudinally relative to member 12. Thereafter, the sleeve 40 is inserted through the open end of the elongated member 12 and the end portion 44 is threaded onto the threaded portion 34. An axial force is then applied to the outer end of the sleeve 40 so that the split ring 50 is compressed sufficiently and forced into the groove 44 to allow the shoulder 70 to be moved into engagement with the free end of the sleeve 22. With the shoulder 70 engaging the end of the elongated sleeve 20, the groove 46 is aligned with the groove 48 defined on the inner wall of the opening 22 and the resiliency of the retaining element or split ring 50 will cause a portion thereof to be received into the groove 48. In this position, the sleeve 40 is supported for rotation within the opening 22 and the retaining element 50 prevents axial movement of the sleeve within the opening 22. The elongated member thus defines means supporting the sleeve for rotation about an axis and the clamping block for axial shifting relative to the axis.

Subsequently, the free end of the screw 18 is axially inserted through the aligned openings 60 and 62 and is threaded into the bore 64. In the assembled condition, rotation of the sleeve 40 will cause an axial shifting of the block 14 while rotation of the knob 66 will cause movement of the free end 68 of the screw 18 into engagement with a wall of the recess 32.

A matrix band 80 (FIGS. 1 and 5) is then deformed to a looped configuration with the opposite ends 82 received in the recess 32 on the movable block 14 and intermediate portions received in portions of the slots 26 and 28. The ends 82 are then locked in the recess by rotating the knob 66 in a clockwise direction, as viewed from the end of the retainer. Rotation of the knob will cause the free end 68 to be moved towards the wall of the recess 32 and securely lock the ends 82 of the band 80 within the recess.

The looped portion of the matrix band 80 is thereafter telescoped over a tooth 90 in a manner shown in FIG. 5 and the sleeve 40 is rotated in a counterclockwise direction, again as viewed in FIG. 1, so as to decrease the size of the loop of the band 80 and snugly embrace the vertical walls of the tooth 90 with the band 80.

An inspection of FIG. 5 will show that the circular cross section of the angularly related end portion, defining the clamped guide means 24, will space the adjacent surface of the guide means 24 from the gums 92 and prevent penetration of the retainer into the gums. Such an arrangement is highly desirable since it substantially eliminates the possibility of lacerating the gums while the retainer is being manipulated within the mouth.

Furthermore, an inspection of FIGS. 1 and 4 will show that substantially all of the movable block 14 is located below the passageway 36 and is enclosed by the sleeve 20. More particularly, the entire threaded portion of the movable block, as well as the cooperating threaded portions of the sleeve 40, are substantially enclosed and only a minor portion of the block extends through the lateral slot 36. This will prevent the possibility of laceration of the patient's tongue or lips while the retainer is being manipulated.

A principal advantage of the present retainer assembly is the simplicity in which the parts are assembled, which allows for disassembly and replacement of any of the parts. For example, it has been found that the threaded portions 34 and 64 on movable block 30 are subjected to the greatest amount of wear. However, by the present arrangement of the various parts, the entire movable block 14 may readily be removed and replaced. This is accomplished by removing the screw 18, rotating the sleeve 40 so that the free end of the movable block 14 engages the adjacent end of the band guide means 24 and subsequently producing additional rotation of the sleeve 40 so as to force the split ring 50 out of the groove 48 in the opening 22. Once the split ring has been forced out of the groove 48 and into the groove 46, the sleeve 40 and the movable block 14 may be separated and either or both of the parts may be replaced. Such an arranegment considerably reduces the cost of using matrix retainers, since the parts subjected to the greatest wear may readily be replaced without replacing the entire unit.

What is claimed is:

1. A matrix comprising: an elongated generally tubular member having a plurality of slots adjacent one end, at least said one end being generally circular in cross-section; a looped matrix band having an intermediate portion receivable in at least one of said slots; a movable block slidably supported in said elongated member and having a recess for receiving the ends of said band, said block having an externally threaded portion disposed entirely within the confines of said elongated member; clamp means on said block for locking said ends in said recess; and moving means for said block including a sleeve rotatably mounted within said elongated member and extending outwardly from an end opposite said one end, said sleeve having a threaded bore receiving said externally threaded portion; and means for releasably supporting said sleeve for rotation on said elongated member whereby rotation of said sleeve on said elongated member will increase and decrease the size of the loop, said last named means including aligned grooves in said elongated member and said sleeve, and a split ring received in said grooves.

2. A matrix as defined in claim 1, in which said elongated member defines an elongated opening having a lateral slot along a major portion of one side thereof, said movable block is slidable in said opening and has a minor portion extending through said lateral slot with a major portion of said block disposed below said slot so as to be substantially enclosed by said elongated member in the assembled condition.

3. A matrix as defined in claim 1, in which said clamp means includes means defining a threaded opening in said block, said threaded opening communicating with said recess; and a screw extending through said sleeve and received in said threaded opening, said screw having a free end cooperating with a wall of said recess to lock said band.

4. A matrix as defined in claim 1, in which said elongated member has a main body portion defining an opening; said body portion being substantially circular in cross section and having an angularly related element on one end closing said opening and defining said slots; and means defining a lateral slot in said main body portion communicating with said opening, said block being slidable in said opening and having a minor portion extending from said body portion.

5. A matrix retainer comprising an elongated generally tubular member having an internal opening, matrix band guide means closing one end of said opening, said one end being generally circular in cross-section; means defining an elongated passageway in said member adjacent said one end, said passageway communicating with said opening; a block slidable in said opening and having a major portion enclosed by said elongated member; said block having a threaded portion disposed entirely within the confines of said elongated member and extending towards the opposite end of said opening; clamp means on said block for securing a matrix band; moving means for said block and including a sleeve received in said opening; retaining means for releasably supporting said sleeve for rotation in the opposite end of said opening, said retaining means including aligned grooves in said elongated member and said sleeve, and a split ring received in said grooves; said sleeve having a threaded element cooperating with said threaded portion for moving said block in opposite directions upon rotation of said sleeve in opposite directions in said opening.

6. A matrix retainer as defined in claim 5, in which said matrix band guide means comprises first and second intersection slots in said one end of said elongated member, one of said slots extending axially of said opening.

7. A matrix retainer as defined in claim 6, in which said clamp means includes means defining a recess in said block and a threaded bore communicating with said recess and extending through said threaded portion; and a screw extending through said sleeve and received in said threaded bore.

References Cited
UNITED STATES PATENTS

| | | | |
|---|---|---|---|
| 3,020,638 | 2/1962 | Tofflemire | 32—63 |
| 3,462,841 | 8/1969 | Ainsworth | 32—63 |

ROBERT PESHOCK, Primary Examiner